United States Patent
Yamauchi et al.

(10) Patent No.: US 9,583,764 B2
(45) Date of Patent: Feb. 28, 2017

(54) NICKEL COMPOSITE HYDROXIDE AND PRODUCTION METHOD THEREOF, CATHODE ACTIVE MATERIAL FOR A NON-AQUEOUS ELECTROLYTE SECONDARY BATTERY AND PRODUCTION METHOD THEREOF, AND A NONAQUEOUS ELECTROLYTE SECONDARY BATTERY

(71) Applicant: SUMITOMO METAL MINING CO., LTD., Tokyo (JP)

(72) Inventors: Mitsuru Yamauchi, Ehime (JP); Kazuomi Ryoshi, Ehime (JP); Kensaku Mori, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 15/135,804

(22) Filed: Apr. 22, 2016

(65) Prior Publication Data
US 2016/0268605 A1 Sep. 15, 2016

Related U.S. Application Data

(62) Division of application No. 14/380,657, filed as application No. PCT/JP2013/054595 on Feb. 22, 2013.

(30) Foreign Application Priority Data

Feb. 23, 2012 (JP) ................................ 2012-038053

(51) Int. Cl.
*H01M 4/505* (2010.01)
*H01M 4/525* (2010.01)
(Continued)

(52) U.S. Cl.
CPC ............ *H01M 4/505* (2013.01); *C01G 53/00* (2013.01); *C01G 53/006* (2013.01); *C01G 53/40* (2013.01);
(Continued)

(58) Field of Classification Search
CPC .... H01M 4/505; H01M 4/0497; H01M 4/525; H01M 10/525; H01M 10/052;
(Continued)

(56) References Cited

U.S. PATENT DOCUMENTS 8,592,085 B2 11/2013 Kobino et al.
2011/0180748 A1 7/2011 Jahn et al.
(Continued)

FOREIGN PATENT DOCUMENTS

DE 10 2006 01553 10/2007
DE 10 2006 015538 A1 10/2007
(Continued)

OTHER PUBLICATIONS

Plantz Explanation-of-Data-Reported-by-Microtrac-Instruments SL-AN-16 Rev F Dec. 18, 2008 Hatfield PA 19440 USA {http://www.microtrac.net/MTWP/wp-content/uploads/2012/10/Explanation-of-Data-Reported-by-Microtrac-Instruments.pdf}.*

(Continued)

*Primary Examiner* — Patrick Ryan
*Assistant Examiner* — Aaron Greso
(74) *Attorney, Agent, or Firm* — Finnegan, Henderson, Farabow, Garrett & Dunner LLP

(57) ABSTRACT

When producing a nickel composite hydroxide that is a precursor to the cathode active material for a non-aqueous electrolyte secondary battery by supplying an aqueous solution that includes at least a nickel salt, a neutralizing agent and a complexing agent into a reaction vessel while stirring and performing a crystallization reaction, a nickel composite (Continued)

hydroxide slurry is obtained while controlling the ratio of the average particle size per volume of secondary particles of nickel composite hydroxide that is generated inside the reaction vessel with respect to the average particle size per volume of secondary particles of nickel composite hydroxide that is finally obtained so as to be 0.2 to 0.6, after which, while keeping the amount of slurry constant and continuously removing only the liquid component, the crystallization reaction is continued until the average particle size per volume of secondary particles of the nickel composite hydroxide becomes 8.0 µm to 50.0 µm.

4 Claims, 2 Drawing Sheets

(51) Int. Cl.
*H01M 4/04* (2006.01)
*H01M 10/052* (2010.01)
*H01M 10/0525* (2010.01)
*C01G 53/00* (2006.01)

(52) U.S. Cl.
CPC ............ *C01G 53/42* (2013.01); *C01G 53/50* (2013.01); *H01M 4/0497* (2013.01); *H01M 4/525* (2013.01); *H01M 10/052* (2013.01); *H01M 10/0525* (2013.01); *C01P 2002/50* (2013.01); *C01P 2004/03* (2013.01); *C01P 2004/61* (2013.01); *C01P 2006/11* (2013.01); *C01P 2006/40* (2013.01); *Y02E 60/122* (2013.01); *Y02P 70/54* (2015.11)

(58) Field of Classification Search
CPC ............ C01P 2002/50; C01P 2004/03; C01P 2004/61; C01P 2006/11; C01P 2006/40; Y02E 60/122; Y02P 70/54; C01G 53/00; C01G 53/40; C01G 53/42; C01G 53/50; C01G 53/006
See application file for complete search history.

(56) References Cited

U.S. PATENT DOCUMENTS

| | | | |
|---|---|---|---|
| 2012/0270107 A1* | 10/2012 | Toya | .................. C01G 53/006 429/223 |
| 2012/0276454 A1 | 11/2012 | Mori et al. | |

FOREIGN PATENT DOCUMENTS

| | | |
|---|---|---|
| EP | 0649818 A1 | 10/1994 |
| EP | 2 104 163 A1 | 9/2009 |
| JP | 1995-165428 | 6/1995 |
| JP | 1996-119636 | 5/1996 |
| JP | 1998-025117 | 1/1998 |
| JP | 1998-029820 | 3/1998 |
| JP | 1995-165428 | 6/2005 |
| JP | 2005-302507 | 10/2005 |
| JP | 2005-336004 | 12/2005 |
| JP | 2008-147068 A | 6/2008 |
| JP | A-2010170741 | 1/2009 |
| JP | 2011105588 A | 10/2010 |
| JP | 2010-536697 | 12/2010 |
| JP | 2011-105594 | 2/2011 |
| JP | 2011-105588 | 6/2011 |
| JP | 2011-116582 | 6/2011 |
| WO | WO 2011/067935 * | 6/2011 ............ C01G 53/00 |
| WO | WO 2011/067937 A1 | 9/2011 |

OTHER PUBLICATIONS

Extended European Search Report issued by the European Patent Office in counterpart foreign Application No. 13751304.0 on Oct. 23, 2015, 9 pages.
International Search Report re PCT Application No. JP 2013/054595 dated Feb. 23, 2013, 11 pages.
Office Action issued by the State Intellectual Property Office of People's Republic of China in Counterpart Patent Application No. 201380010517.2 on May 29, 2015 and English translation thereof.
Office Action issued by the Korean Intellectual Property Office in counterpart Application No. 10-2014-7026419 mailed Aug. 24, 2015, and English translation thereof.
International Search Report and Written Opinion of the International Search Authority in counterpart PCT Application No. JP 2013/054595 dated Feb. 23, 2013, 11 pages, and English translation thereof.

* cited by examiner

NICKEL COMPOSITE HYDROXIDE AND PRODUCTION METHOD THEREOF, CATHODE ACTIVE MATERIAL FOR A NON-AQUEOUS ELECTROLYTE SECONDARY BATTERY AND PRODUCTION METHOD THEREOF, AND A NONAQUEOUS ELECTROLYTE SECONDARY BATTERY

CROSS REFERENCES TO RELATED APPLICATIONS

This application is a division of U.S. patent application Ser. No. 14/380,657 filed Aug. 22, 2014, entitled "NICKEL COMPOSITE HYDROXIDE AND PRODUCTION METHOD THEREOF, CATHODE ACTIVE MATERIAL FOR A NON-AQUEOUS ELECTROLYTE SECONDARY BATTERY AND PRODUCTION METHOD THEREOF, AND A NONAQUEOUS ELECTROLYTE SECONDARY BATTERY," which is a 371 of PCT/JP2013/054595, filed Feb. 22, 2013, and claims priority to JP2012/038053, filed on Feb. 23, 2012. The disclosure of the above-referenced applications is expressly incorporated herein by reference in its entirety.

TECHNICAL FIELD

The present invention relates to a nickel composite hydroxide that is a precursor to a cathode active material for a non-aqueous electrolyte secondary battery and production method thereof, a cathode active material for a non-aqueous electrolyte secondary battery that uses the nickel composite hydroxide as raw material and production method thereof, and a non-aqueous electrolyte secondary battery that uses this cathode active material for a non-aqueous electrolyte secondary battery as the cathode material.

BACKGROUND ART

In recent years, as the use of portable devices such as portable telephones, notebook type personal computers and the like have become popular, there is a strong need for the development of compact and lightweight secondary batteries that have a high-energy density. As such a battery, there are lithium ion secondary batteries that use lithium, lithium alloy, metallic oxide, or carbon as the anode.

Lithium composite oxide is used as cathode active material for the cathode material of a lithium ion secondary battery. Lithium cobalt composite oxide can be relatively easily synthesized, and imparts 4V class high voltage in a lithium ion secondary battery as the cathode material, so is expected to be used as material for making practical a secondary battery having a high-energy density. In regards to lithium cobalt composite oxide, research and development for achieving an excellent initial capacity characteristic and cycling characteristic in a secondary battery is advancing, and various results have already been obtained.

However, lithium cobalt composite oxide uses a cobalt compound, which is rare and expensive, as the raw material, so causes the cost of the cathode material and secondary battery to increase. A lithium ion secondary battery that uses lithium cobalt composite oxide has a unit cost per volume that is approximately 4 times that of a nickel-metal hydride battery, so its applicable uses are limited. Therefore, from the aspect of achieving portable devices that are more lightweight and compact, it is necessary to lower the cost of the cathode active material and to make possible the production of a less expensive lithium ion secondary battery.

One cathode active material that can be used in the place of a lithium cobalt composite oxide, is a lithium nickel composite oxide that uses nickel that is less expensive than cobalt. Lithium nickel composite oxide has the same high battery voltage as lithium cobalt composite oxide, has a lower electrochemical potential than lithium cobalt composite oxide, and decomposition due to oxidation of the electrolyte does not easily become a problem, so use as a cathode active material that will make possible higher capacity in a secondary battery is expected. In order for this, research and development of a lithium nickel composite oxide is also being actively performed.

Battery capacity is known to have a close relationship with the packing characteristic. The higher the packing density is, the more cathode active material can be packed inside an electrode having the same volume, so the battery capacity increases. When the particle density is the same, increasing the particle size is effective in order to increase the packing density. However, mixing of particles having a too large particle diameter, for example, particles that exceed 50 μm into the cathode active material, causes clogging of a filter during filtration after mixing of the cathode active material slurry, and also causes occurring of lineation (long thin shaped defects) during coating.

In regard to the packing characteristic of cathode active material, JP 2005-302507 (A) discloses a cathode active material that is constructed by a powder comprising secondary particles that are formed by an aggregation of primary particles and that have a spherical or elliptical shape having a particle size of 40 μm or less, with the percentage of particles having a particle size of 1 μm or less being 0.5% by volume to 7.0% by volume. With such a structure, it is possible to improve the packing characteristic, however, the particle size distribution is wide, so use as a cathode active material causes the voltage applied to the particles inside the electrode to become uneven, and minute particles selectively deteriorate due to repeated charging and discharging, which brings about a decrease in the battery capacity of the battery due to a decrease in the coulomb efficiency.

Therefore, for a cathode active material that is used in a battery that has high capacity and that can be industrially produced, it is necessary that the particle size be moderately large, and that the particle size distribution be sharp.

A lithium nickel composite oxide is obtained by calcination of a nickel composite hydroxide, which is the precursor to the lithium nickel composite oxide, together with a lithium compound. Particle characteristics such as particle size and particle size distribution of a lithium nickel composite oxide basically inherits the particle characteristics of the nickel composite hydroxide, so in order to obtain a cathode active material that has a desired particle size and particle size distribution, it is necessary to obtain a suitable particle size and particle size distribution in the precursor stage.

A crystallization reaction method is typically used as a production method for producing nickel composite hydroxide. In order to obtain particles having a sharp particle size distribution, a method of performing crystallization in a batch process is effective, however, a batch method has a disadvantage in that productivity is inferior compared to a continuous method that uses an overflow method. Furthermore, in order to obtain large particles in a batch process, it is necessary to increase the amount of raw material supplied, and as a result, the reaction vessel becomes larger, and productivity further decreases.

In order to improve productivity, a method is being investigated that suppresses an increase in amount of the reaction system by discharging solvent to the outside of the system while performing crystallization in a batch process. JP H08-119636 (A) discloses a method for generating nickel hydroxide particles in which nickel salt aqueous solution, ammonia water and alkali hydroxide aqueous solution are continuously supplied at fixed ratios, and before the reaction system overflows from the reaction vessel, solvent is removed to an extent that thorough mixing can be performed, and this increasing the amount of the reaction system by the supplying the feed solution for reaction and decreasing the amount by removing solvent is repeatedly performed. However, in this method, increasing the amount of the reaction system by supplying the feed solution for reaction and decreasing the capacity by removing solvent is repeatedly performed, so the number of particles per volume of solvent of the reaction system fluctuates and it is easy for particle growth to become unstable, so there is a problem in that particle size distribution worsens due to minute particles that are newly generated during the reaction.

Moreover, JP H07-165428 (A) discloses a method in which nickel salt aqueous solution, ammonia water and alkali hydroxide aqueous solution are simultaneously and continuously supplied at fixed ratios into a reaction tank that has a filtration function, and after the amount of the reaction system has reached a specified amount, the solvent in the reaction tank is continuously filtered by the filtration function and removed, and while keeping the amount of the reaction system nearly constant, nickel hydroxide is crystallized under specified mixing conditions. With this method, solvent is continuously removed by filtering, so the number of particles per volume of solvent in the reaction system becomes fixed, and the growth of particles is stable. However, with that example, the ratio of the supplied amount of raw material after removal of solvent has started with respect to the supplied amount of raw material up to when the removal of solvent is started is large. In that case, the growth rate from the particle size of particles generated in the initial stage of crystallization until the particle size in the final state of crystallization becomes large, and there is a possibility that minute particles will be generated in the reaction solution. Moreover, in the case where it is presumed that the number of particles does not change and the density is fixed, for example, in order to allow 2 μm particles to grow to 12 μm, it is necessary to increase the volume by 216 times. Therefore, in order to set a state in which a slurry concentration to which raw material has been added can be mixed until the particles grow to be 12 μm, it is necessary to reduce the initial slurry concentration. Therefore, the time during which raw material is supplied and caused to react becomes long, and productivity decreases. In this way, in the case of the method disclosed in JP 07-165428 (A), it can be said that producing particles having a large particle size is very difficult.

On the other hand, in JP H10-025117 (A) and JP 2010-536697 (A), in order to keep the slurry concentration in the system fixed, not only solvent, but also particles are discharged to the outside of the system, and the particles that were discharged to the outside of the system are returned to the reaction system. In the case that the particles that were discharged to the outside of the system are not returned to the reaction system, the number of particles in the reaction system decreases, and there is a possibility that the particle size will increase due to particle growth in this state. However, by returning the discharged particles to the reaction system, as in a continuous crystallization operation, minute particles that have not grown sufficiently, and coarse particles that have grown too much are mixed, so it is difficult to obtain particles having a sharp particle size distribution.

RELATED LITERATURE

Patent Literature

[Patent Literature 1] JP 2005-302507 (A)
[Patent Literature 2] JP H08-119636 (A)
[Patent Literature 3] JP H07-165428 (A)
[Patent Literature 4] JP H10-025117 (A)
[Patent Literature 5] JP 2010-536697 (A)

SUMMARY OF INVENTION

Problem to be Solved by Invention

In consideration of the problems above, the object of the present invention is to provide a cathode active material for a non-aqueous electrolyte secondary battery that has a uniform particle size and high packing density, and that is capable of increased battery capacity and improved coulomb efficiency, and to provide a nickel composite hydroxide as a precursor that makes it possible to provide such a cathode active material for a non-aqueous electrolyte secondary battery.

Means for Solving Problems

As a result of diligent investigation in regard to the improvement of productivity of a nickel composite hydroxide by a batch method, and making the particle size uniform, it was found that while concentrating the particles initially generated and the liquid component in a reaction tank, by controlling the ratio of the particle size of particles initially generated with respect to the particles finally obtained, that a nickel composite hydroxides having excellent particle size distribution could be obtained while maintaining a high level of productivity, and that a cathode active material that is obtained using such a nickel composite hydroxide had a uniform particle size, high packing density and high coulomb efficiency, resulting in the completion of the present invention.

In other words, the present invention relates to a method for producing nickel composite hydroxide by supplying an aqueous solution that includes at least a nickel salt, a neutralizing agent and a complexing agent to a reaction vessel while stirring, and performing a crystallization reaction.

Particularly, in the present invention, crystallization is divided into two stages: a primary crystallization process of obtaining a nickel composite hydroxide slurry while performing control so that the ratio of the average particle size per volume (MV) of secondary particles of nickel hydroxide that are generated inside the reaction vessel with respect to the average particle size per volume (MV) of secondary particles of nickel composite hydroxide that will finally be obtained becomes 0.2 to 0.6; and a secondary crystallization process of continuing the crystallization reaction until the average particles size per volume (MV) of secondary particles of the nickel composite hydroxide becomes 8.0 μm to 50.0 μm, while at the same time maintaining the amount of the slurry obtained in the primary crystallization process and continually removing only the liquid component of the slurry.

In the primary crystallization process, the pH of the slurry is controlled to be within a range of 10 to 13, and preferably within a range of 10.5 to 12.5 at a reference liquid temperature of 25° C.

Moreover, in the secondary crystallization process, the concentration of a nickel amine complex in the slurry is controlled to be within a range of 10 mg/L to 1500 mg/L.

Furthermore, in the secondary crystallization process, the amount of the slurry is kept constant by using a cross-flow filtering apparatus. Preferably, a ceramic filter is used as the filter material for this cross-flow filtering apparatus.

The composition of the components of the aqueous solution that includes the nickel salt is essentially determined in the same way as the nickel composite hydroxide that is the precursor to the cathode active material according to the characteristics required for the obtained cathode active material, and is preferably prepared according to the composition of a nickel composite hydroxide that is expressed by the general expression: $Ni_{1-x-y}Co_xM_y(OH)_{2+A}$ (where $0 \le x \le 0.35$, $0 \le y \le 0.35$, $0 \le A \le 0.5$, and M is at least one additional element that is selected from the group comprising Mn, V, Mg, Al, Ti, Mo, Nb, Zr and W), and is more preferably prepared according to the composition of a nickel composite hydroxide that is expressed by the general expression: $Ni_{1-x-y}Co_xM_y(OH)_{2+A}$ (where $0 \le x \le 0.22$, $0 \le y \le 0.15$, $x+y<0.3$, $0 \le A \le 0.5$, and M is at least one additional element that is selected from the group comprising Mn, V, Mg, Al, Ti, Mo, Nb, Zr and W).

Moreover, the nickel composite hydroxide of the present invention is characterized by comprising secondary particles of nickel composite hydroxide that are formed by an aggregation of plural primary particles, wherein the secondary particles have an average particle size per volume (MV) that is within a range of 8.0 µm to 50.0 µm, and (D90–D10)/MV that indicates the particle size distribution per volume that is less than 0.5. This kind of nickel composite hydroxide can be suitably produced by the production method of the present invention.

The composition of this nickel composite hydroxide preferably has a composition that is expressed by the general expression: $Ni_{1-x-y}Co_xM_y(OH)_{2+A}$ (where $0 \le x \le 0.35$, $0 \le y \le 0.35$, $0 \le A \le 0.5$, and M is at least one additional element that is selected from the group comprising Mn, V, Mg, Al, Ti, Mo, Nb, Zr and W), and more preferably has a composition that can be expressed by the general expression: $Ni_{1-x-y}Co_xM_y(OH)_{2+A}$ (where $0 \le x \le 0.22$, $0 \le y \le 0.15$, $x+y<0.3$, $0 \le A \le 0.5$, and M is at least one additional element that is selected from the group comprising Mn, V, Mg, Al, Ti, Mo, Nb, Zr and W).

The average particle size per volume (MV) is preferably in a range of 18.0 µm to 50.0 µm.

Alternatively, the secondary particles are such that the average particle size per volume (MV) is in a range of 8.0 µm to 20.0 µm, and the tap density is 1.9 g/cm$^3$ or more.

The production method for producing a cathode active material for a non-aqueous electrolyte secondary battery of the present invention, comprises: a mixing process of forming a lithium mixture by mixing the nickel composite hydroxide of the present invention, or a nickel composite oxide that was obtained by roasting the nickel composite hydroxide of the present invention in an oxidizing atmosphere at 300° C. to 1000° C. with a lithium compound: and a calcination process of performing calcination of this lithium mixture in an oxidizing atmosphere at 650° C. to 1100° C.

Moreover, the cathode active material for a non-aqueous electrolyte secondary battery of the present invention is characterized by comprising secondary particles of nickel composite oxide that are formed by an aggregation of plural primary particles, wherein the secondary particles have an average particle size per volume (MV) that is within a range of 8.0 µm to 50.0 µm, and (D90–D10)/MV that indicates the particle size distribution per volume that is less than 0.5. Particularly, when trying to achieve a high output characteristic, preferably the secondary particles have an average particle size per volume (MV) that is within a range of 8.0 µm to 20.0 µm, (D90–D10)/MV that indicates the particle size distribution per volume that is less than 0.5, and a tap density of 2.2 g/cm$^3$ or more. A cathode active material having this kind of characteristic can be suitably produced by the production method of the present invention described above.

Furthermore, preferably the standard deviation of the average particle size of primary particles of the secondary particles is 10% or less, and when used in the cathode of a lithium coin cell battery 2032 (CR2032), preferably the coulomb efficiency of that battery is 90% or more.

The composition of the lithium nickel composite oxide of this cathode active material preferably has a composition that is expressed by the general expression: $Li_{1+u}Ni_{1-x-y}Co_xM_yO_2$ (where $-0.05 \le u \le 0.50$, $0 \le x \le 0.35$, $0 \le y \le 0.35$, and M is at least one additional element that is selected from the group comprising Mn, V, Mg, Al, Ti, Mo, Nb. Zr and W), and more preferably has a composition that is expressed by the general expression: $Li_{1+u}Ni_{1-x-y}Co_xM_yO_2$ (where $-0.05 \le u \le 0.20$, $0 \le x \le 0.22$, $0 \le y \le 0.15$, $x+y<0.3$ and M is at least one additional element that is selected from the group comprising Mn, V, Mg, Al, Ti, Mo, Nb, Zr and W).

Furthermore, the present invention provides a non-aqueous electrolyte secondary battery having a cathode that is made from the cathode active material for a non-aqueous electrolyte secondary battery described above.

Effect of Invention

With the present invention, it is possible to obtain a nickel composite hydroxide as a precursor to a cathode active material for a non-aqueous electrolyte secondary battery that has a uniform particle size and high packing density, and that is capable of increased battery capacity and improved coulomb efficiency, without obstructing productivity. With the nickel composite hydroxide of the present invention used as a precursor, it becomes possible to easily obtain a cathode active material that is capable of higher battery capacity and improved coulomb efficiency when used as a cathode material of a battery, with high productivity. Therefore, the present invention can be said to have very high industrial value.

MODES FOR CARRYING OUT INVENTION

Figure 1:
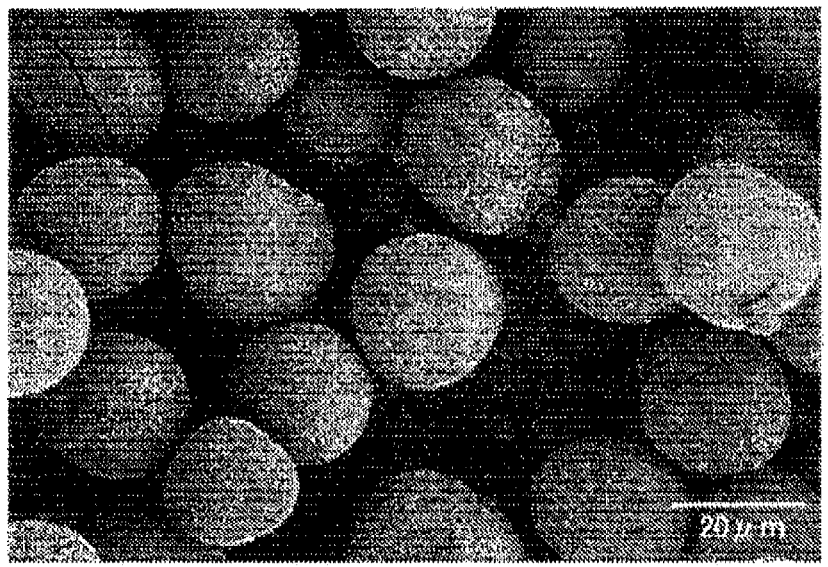
FIG. 1 is an SEM photograph (observation magnification rate: 1,000×) of a nickel composite hydroxide that was obtained in a first example.

The present invention relates to: (1) a nickel composite hydroxide for a non-aqueous electrolyte secondary battery and a production method thereof; (2) a cathode active material for a non-aqueous electrolyte secondary battery and a production method thereof; and (3) a non-aqueous electrolyte secondary battery that uses that cathode active material for a non-aqueous electrolyte secondary battery in the cathode. In the following, the invention of (1) to (3) above will be explained in detail, however, first, the main feature of the present invention, which is a nickel composite hydroxide and production method thereof will be explained.

(1-1) Production Method for Nickel Composite Hydroxide

The production method for nickel composite hydroxide of the present invention relates to a method for producing nickel composite hydroxide by supplying an aqueous solution that includes at least a nickel salt, a neutralizing agent and a complexing agent into a reaction vessel while stirring, and then performing a crystallization reaction.

In the production method for nickel composite hydroxide of the present invention, crystallization is divided into two stages, comprising: a primary crystallization process in which an aqueous solution that includes at least a nickel salt, a neutralizing agent and a complexing agent are supplied to fill a reaction vessel, and while performing control so that the ratio of the average particle size (MV) per volume of secondary particles of nickel composite hydroxide generated in the reaction vessel to the average particle size per volume (MV) of secondary particles of nickel composite hydroxide that is finally obtained is 0.2 to 0.6, a nickel composite hydroxide slurry is obtained; and a secondary crystallization process in which the volume of slurry that was obtained in the primary crystallization process is kept constant, and while continuously removing only the liquid component of the slurry, the crystallization reaction is continuously performed until the average particle size per volume (MV) of secondary particles of the nickel composite hydroxide becomes 8.0 μm to 50.0 μm. Each process will be explained in detail below.

a) Primary Crystallization Process

In the primary crystallization process, the average particle size per volume (MV) of the secondary particles of the nickel composite hydroxide that is generated in the slurry must be controlled so that the ratio with respect to the target average particle size per volume (MV), or in other words, the average particle size per volume (VM) of secondary particles of nickel composite hydroxide that is finally obtained in the secondary crystallization process that will be described later (hereafter, referred to as the "ratio of average particle size per volume") is 0.2 to 0.6, or preferably, 0.25 to 0.6, or even more preferably, 0.3 to 0.6. The average particle size per volume (MV) is the average particle size that has been weighted by the particle volume, and in an aggregation of particles, is the diameter of a particle multiplied by the volume of that particle and totaled for all particles and then divided by the total volume of particles. The average particle size per volume (MV) can be measured, for example, by a laser diffraction scattering method using a laser diffraction particle size distribution meter.

More specifically, when the average particle size per volume (MV) of secondary particles of the nickel composite hydroxide that is finally obtained in the secondary crystallization process is regulated to the range 8.0 μm to 50.0 μm, control is performed so that the average particle size per volume (MV) of secondary particles that are initially generated is in the range 1.6 μm to 20 μm, and preferably, 2 μm to 18 μm, and even more preferably, 2.5 μm to 15 μm. The upper limit of the average particle size per volume (MV) of the secondary particles that are generated in the primary crystallization process is about 25 μm.

As a result, in the secondary crystallization process, it is possible to grow secondary particles without generating minute particles, and thus it is possible to obtain a nickel composite hydroxide having a uniform particle size and a good particle size distribution, or in other words, a particle size distribution that is sharp. When the ratio of the average particle size per volume of the secondary particles generated in the primary crystallization process becomes less than 0.2, and when the target average particle size per volume (MV) of secondary particles is 20.0 μm, the average particle size per volume (MV) of the generated secondary particles cannot be more than about 4.0 μm, and in order to cause the secondary particles to grow to the target particle size, the secondary particles must be concentrated until the slurry concentration (number of particles with respect to the amount of liquid component) of the nickel hydroxide in the reaction vessel in the secondary crystallization process is very high, however, due to an increase in viscosity, stirring becomes difficult, and particles having a uniform particle size are not generated. Moreover, an increase in power is necessary in order to perform stirring, which is disadvantageous in industrial production. In addition, the rate of growth from the particle size of secondary particles that are generated in the primary crystallization process to the target particle size is large, so there is a large chance for nucleation during growth, and minute particles are generated.

On the other hand, in order to achieve high productivity, preferably the number of particles per volume of solvent that is generated in the primary crystallization process is increased, or in other words, preferably the slurry concentration is increased. This slurry concentration is represented by the number of moles of generated hydroxide and is 1 mol/L to 2 mol/L. When the slurry concentration is less than 1 mol/L, the number of generated particles per volume decreases, and the area of growth reaction is reduced, so it becomes easy for minute particles to be generated. On the other hand, when the slurry concentration exceeds 2 mol/L, uniform stirring may become difficult due to an increase in viscosity. In order to control the slurry concentration to be within this kind of range, preferably the pH-adjusted solvent that is put into the reaction vessel in advance is reduced within a range that stirring is possible.

On the other hand, when the ratio of the average particle size per volume exceeds 0.6, the number of generated particles per volume inside the reaction vessel decreases, and the area of growth reaction is reduced, so in the primary crystallization process and the secondary crystallization process, minute particles are generated during particle growth, and it becomes difficult to obtain a uniform particle size. Moreover, the amount of raw material that is supplied in the secondary crystallization process is decreased, so productivity decreases.

In order to grow secondary particles having a particle size such that the ratio of the average particle size per volume is 0.2 to 0.6, the particle size must be controlled according to crystallization conditions. For example, the pH during reaction is lowered, or more specifically, a method is used in which control is performed so that the pH is within the range 10 to 13, or more preferably within the range 10.5 to 12.5, at a reference liquid temperature of 25° C., or in other words, when the liquid temperature is 25° C. As a result, particles having a large particle size are obtained while at the same time nucleation is suppressed.

In the primary crystallization process stage, there is no problem even when the particles having a large particle size distribution when the ratio of average particle size per volume is in the range above. This is because in the secondary crystallization process, the number of particles is fixed, and the growth reaction area does not fluctuate, so raw material that is supplied is consumed by the particle growth and the difference in particle size among the particles becomes small.

For example, when the ratio of average particle size per volume is 0.5, the case in which the secondary particles A (particle size: a) at the end of the primary crystallization process continue to grow in the secondary crystallization process until the secondary particles B (particle size: b) have the target average particle size per volume will be considered. Here, the volume $V_A$ of the secondary particles A is taken as a reference ($V_A=(4/3)\cdot\pi\cdot a^3=1$). The particle size of the secondary particles B becomes two times that of the secondary particles A (a/b=0.5, so b=2a), and the volume $V_B$ of the secondary particles B, with the volume $V_A$ of the secondary particles A as a reference, becomes 8 ($V_B=(4/3)\cdot\pi\cdot b^3=(4/3)\cdot\pi\cdot(2a)^3=8\cdot(4/3)\cdot\pi\cdot a^3=8$). In other words, an amount corresponding to 7 times the volume of the secondary particles A is consumed in the growth from secondary particles A to secondary particles B.

On the other hand, the case in which secondary particles C (particle size c) having a ratio of average particle size per volume of 0.33 are mixed with the secondary particles A and grown with the same amount will be considered. Here, the particle size of the secondary particles at the end of the primary crystallization process becomes 0.66 times that of the secondary particles A (c/b=c/2a=033, so c=0.66a), so, taking the secondary particles A as a reference, the volume $V_C$ of the secondary particles C becomes approximately 0.3 ($V_C=(4/3)\cdot\pi\cdot c^3=(4/3)\cdot\pi\cdot(0.66a)^3\approx 0.3\cdot(4/3)\cdot\pi\cdot a^3=0.3$). When grown with the same as the growth of the secondary particles A, the volume $V_D$ of secondary particles after growth is 7.3 with the secondary particles A as a reference. In other words, the particle size of the secondary particles D that were grown to the final particle size becomes 1.94 times that of the secondary particles A ($V_D/V_A=d^3/a^3=7.3$, so d=1.94a), and secondary particles D having a particle size that is 97% that of the secondary particles B are obtained ((d/b=1.94/2=0.97). Therefore, even when secondary particles C having a particle size that is 66% with respect to the secondary particles A before growth are mixed in, the particles grow to secondary particles D having a particle size after growth that is 97% with respect to the secondary particles B, and after growth, the relative difference in particle sizes is greatly reduced to that before growth, so it can be understood that the particle size distribution as well is greatly improved.

A trial calculation will be performed for the case in which secondary particles having a small particles size such as secondary particles C described above (secondary particles having a particle size that is 66% that of secondary particles A) coexist. For example, when the target average particle size per volume is taken to be MV=30 μm and the ratio of the average particle size per volume is 0.3, the particle size of secondary particles A at the end of the primary crystallization process is 9 μm and the particle size of the secondary particles C having a small particle size and that coexist in the primary crystallization process is 5.9 μm. Therefore, the particle size of the secondary particles B at the end of the secondary crystallization process is 30 and the particle size of the secondary particles D is 29.1 μm. Moreover, when the target average particle size per volume is taken to be MV=10 μm, and the ratio of the average particle size per volume is taken to be 0.5, the particles size of the secondary particles A at the end of the primary crystallization process is 5 μm, the particle size of the secondary particles C is 3.3 μm, the particle size of the secondary particles B at the end of the secondary crystallization process is 10 μm, and the particle size of the secondary particles D is 9.7 μm.

Therefore, in the first crystallization process, it is sufficient to perform control of only the average particle size per volume of secondary particles of nickel composite hydroxide that is generated in the slurry so as to be within a specified range, and it is not necessary to consider the particle size distribution itself of the generated secondary particles.

The primary crystallization process ends at the point in time when the reaction vessel becomes full by supplying the aqueous solution containing at least nickel salt, the neutralizing agent and the complexing agent. In other words, a feature of the primary crystallization process is that the reaction is controlled so that at this point in time the average particle size per volume (MV) of the secondary particles that are generated reaches 0.2 to 0.6 that of the target average particle size per volume (MV)

b) Secondary Crystallization Process

In the secondary crystallization process, only the liquid component of the slurry is continuously removed while keeping the amount of slurry that was obtained in the primary crystallization process fixed, and crystallization is continued until the average particle size per volume (MV) of secondary particles becomes 8.0 μm to 50.0 μm, or preferably 9.0 μm to 50.0 μm. By concentrating the slurring in this way, together with improving productivity, it becomes possible to suppress the generation of minute particles during particle growth while maintaining uniformity of particle size. Therefore, the production method of the present invention can also be suitably applied to production of a nickel composite hydroxide having low productivity, is easy for minute particles to be mixed in and has a comparatively large average particle size per volume (MV) of secondary particles.

In order to cause the secondary particles to grow until the average particle size per volume (MV) of secondary particles of nickel composite hydroxide in the slurry becomes 8.0 μm or greater, basically, the crystallization condition of the primary crystallization process is maintained. More specifically, an atmosphere is maintained so that at a reference liquid temperature of 25° C., the pH is kept in a range of 10 to 13, or more preferably 10.5 to 12.5. On the other hand, the temperature of the reaction aqueous solution is adjusted to be in the range 40° C. to 70° C. As a result, even in the secondary crystallization process, it is possible to cause the secondary particles to grow to become secondary particles having a large particle size, while at the same time suppress nucleation.

When the average particle size per volume (MV) is less than 8.0 μm, the number of particles becomes too large and uniform stirring becomes difficult, so making the reaction uniform is difficult and the generation of minute particles occurs. Moreover, the packing characteristic of the cathode active material that is obtained with nickel composite hydroxide used as a precursor is not sufficient. On the other hand, when the average particle size per volume (MV) is greater than 50.0 μm, minute particles are generated in the process for causing the particles to grow to the target particle size, so a uniform particle size is not obtained. Moreover, when producing an electrode that uses the cathode active material that is obtained with the nickel composite hydroxide used as a precursor, it becomes easy for clogging of the filter to occur during filtering of the cathode material slurry, and also for lineation to occur during coating, which is also not desirable.

In order to obtain a better packing characteristic, the average particle size per volume (MV) is preferably 18.0 μm to 50.0 μm, and even more preferably is 18.0 μm to 40 μm.

On the other hand, when trying to obtain a high output characteristic, the average particle size per volume (MV) of the secondary particles above is preferably in the range 8.0 μm to 20.0 μm. As a result, a cathode active material that has both a high coulomb efficiency and good packing characteristic can be obtained at a higher degree.

In the production method of the present invention, in order to concentrate the slurry, it is necessary to continuously remove only the liquid component of the slurry in the secondary crystallization process while keeping the amount of slurry obtained in the primary crystallization process fixed. As a result, it is possible to keep the number of particles per volume in the slurry fixed, and cause the secondary particles of nickel composite hydroxide to stably grow. A method of intermittently removing the liquid component is also feasible, however, in that method, the number of particles per volume of solvent fluctuates, and the growth reaction area is not stable, so it is difficult to cause stable particle growth.

As a method for removing the liquid component, it is possible to use a cross-flow filtering apparatus, a dead-end filtering apparatus and a typical solid/liquid separation method such as precipitation separation. No matter what method is used, it is necessary to sufficiently reduce the particles that are included in the filtrate. When particles are discharged to the filtrate side, not only is productivity reduced but the number of particles in the system is also gradually reduced, and the reaction area for particle growth is decreased. Finally, nucleation occurs, and the number of particles in the system is greatly increased. When the number of particles in the system is increased, the amount of material used per one secondary particle of nickel composite hydroxide is decreased, so the speed to growth of the secondary particles decreases, and as a result, unless the slurry is concentrated to a very high slurry concentration, it is not possible to cause the particles to grow to the target particle size. Moreover, particles that are generated due to nucleation in the secondary crystallization process have a smaller particle size than the particles that existed from the start of the secondary crystallization process due to a short growth time. Therefore, the particle size distribution also worsens.

As a method for removing the liquid component above, using a cross-flow filtering apparatus is preferred. In a cross-flow filtering apparatus, the flow of the slurry and filtrate are in perpendicular directions, and the particles that become clogged in the filter are swept away by the flow of the slurry, so it becomes difficult for the filter to become clogged, and thus it is possible to perform concentration of the slurry continuously and stably. As the filter, it is preferable to use a ceramic filter. This is because a ceramic filter has high durability and chemical resistance when compared with a high polymer filter and the like, and increasing the processing capacity by high-pressure operation, and acid cleaning when blocked can be performed easily.

The material of the ceramic filter is not particularly limited, however, it is possible to use, for example, a alumina ($\alpha Al_2O_3$), zirconium oxide ($ZrO_2$), titanium oxide ($TO_2$) and the like. Moreover, the pore diameter of the ceramic filter is preferably 0.01 μm to 0.5 μm.

On the other hand, a dead-end filtering apparatus has disadvantages in that it is necessary to perform periodic cleaning to prevent the filter from becoming clogged, in order to maintain the apparatus, performing continuous crystallization is difficult. In the case of precipitation separation, as the particle size of particles in the system changes, the speed of precipitation also changes, so control becomes complex. Moreover, time is required for precipitation, so there is a disadvantage in that the size of the apparatus needs to become large in order to perform continuous processing.

In the following, the crystallization conditions in the production method of the present invention will be explained in detail.

(Raw Material Aqueous Solution)

As the raw material aqueous solution, it is possible to use an aqueous solution that includes at least a nickel salt. It is possible to use nickel sulfate, nickel nitrate, nickel chloride and the like as the nickel salt, and from the aspect of cost, impurities and treatment of waste liquid, using nickel sulfate is preferred. Moreover, when a metal other than nickel is added, it is possible to use the sulfate, nitrate and chloride of that metal, and similarly, it is possible to use a sulfate of a metal such as cobalt sulfate.

The salt concentration of this raw material aqueous solution is the total for all salts and is preferably 1.0 mol/L to 2.2 mol/L, and more preferably is 1.5 mol/L to 2.0 mol/L. When the salt concentration of the raw material aqueous solution is less than 1.0 mol/L, the salt concentration is too low, and crystals of nickel composite hydroxide may not grow sufficiently. Moreover, in the primary crystallization process, the slurry concentration will decrease, and it will not be possible to obtain high productivity. In order to increase productivity, making the salt concentration of the raw material aqueous solution 1.5 mol/L or greater is further preferred. On the other hand, when the salt concentration of the raw material aqueous solution exceeds 2.2 mol/L, the concentration exceeds the saturated concentration at normal temperature, so in addition to there being a danger that crystals will be precipitated again and clog the piping, the chance of nucleation increases, and the number of minute particles increases.

(Complexing Agent)

The complexing agent is not particularly limited as long as it is an ammonium ion donor, and as long as it can form a nickel amine complex in the reaction aqueous solution. For example, the complexing agent can be ammonia, ammonium sulfate, ammonium chloride, ammonium carbonate, ammonium fluoride and the like. Moreover, besides an ammonium ion donor, any complexing agent that forms the complex can be used; for example, the complexing agent could be ethylenediaminetetraacetic acid, nitrito triacetic acid, uracil diacetic acid, glycine and the like. Of these, from the aspect of ease of use, the use of ammonia water is preferred.

The added amount of the complexing agent should be a sufficient amount for forming the complex by binding with metal ions that form a complex such as the nickel ions in the reaction aqueous solution; and for example, when the salt concentration of the raw material aqueous solution is 1.0 mol/L, to 2.2 mol/L, the concentration in the reaction aqueous solution is preferably 5 g/L to 20 g/L, and more preferably 8 g/L to 15 g/L. When the concentration in the reaction aqueous solution is less than 5 g/L, the solubility of the metal ions that form the complex is low, so it becomes easy for nucleation to occur, and the ratio of the average particle size per volume of the secondary particles in the primary crystallization process may become less than 0.2, or in the secondary crystallization process, minute particles may be generated causing the particle distribution to become bad.

(pH Control)

The pH in the primary crystallization process and secondary crystallization process is preferably controlled to be within the range 10 to 13 at a reference liquid temperature of 25° C., and more preferably controlled to be within the range 10.5 to 12.5 at a reference liquid temperature of 25° C. When the pH is less than 10, nucleation is suppressed, so it is easy to obtain particles having a large particle size, however, after crystallization, some nickel remains in the liquid component of the slurry. When the pH is greater than 13, the speed of crystallization of the hydroxide may become faster, the number of minute particles may increase, and the particle distribution may worsen. In the primary crystallization process, when the particle size is controlled by adjusting the pH, the pH is preferably controlled to be on the low side of the range 10 to 12. As a result, it becomes easy for the particle size to become large, and even when obtaining a hydroxide having a large particle size, particles having a ratio of average particle size per volume of 0.2 are obtained.

(Neutralizing Agent)

The pH can be controlled by adding an alkali solution, which is a neutralizing agent. The alkali solution is not particularly limited, and, for example, it is possible to use a typical alkali metal hydroxide aqueous solution such as sodium hydroxide, potassium hydroxide and the like. The alkali metal hydroxide can be added directly to a mixed aqueous solution, however, from the aspect of ease of pH control, the alkali metal hydroxide is added as an aqueous solution. In this case, the concentration of the alkali metal hydroxide aqueous solution is 12.5% by weight to 30% by weight, and even more preferably is about 20% by weight to 25% by weight. When the concentration of the alkali metal hydroxide aqueous solution is low, the concentration of the slurry in the primary crystallization process may decrease and productivity may become bad, so preferably the concentration is high, and more specifically, preferably the concentration of the alkali metal hydroxide is 20% by weight or more. On the other hand, when the concentration of the alkali metal hydroxide is greater than 30% by weight, the pH at the added location may locally be high, and minute particles may be generated. The method for adding the alkali solution is not particularly limited, however, is preferably added by a pump such as a constant volume pump that is capable of flow control, and is added while sufficiently stirring the reaction solution so that the pH is within the range 10 to 13.

(Controlling the Complex Concentration)

The nickel amine complex concentration in the reaction aqueous solution is preferably controlled to be within the range 10 mg/L to 1500 mg/L in at least the secondary crystallization process, and more preferably controlled to be within the range 200 mg/L to 1500 mg/L. As a result, together with improving the particle size distribution by suppressing nucleation during crystallization, it is possible to reduce the nickel that is included in the liquid component that is removed to a level that does not affect the cost or composition.

When the concentration is less than 10 mg/L, most of the nickel salt that is added in the secondary crystallization process becomes a hydroxide without passing through a complex and is crystallized, so it is possible that nucleation will not be suppressed, particles having a minute nucleus will be generated and the particle distribution will become large. On the other hand, when the concentration exceeds 1500 mg/L, the amount of nickel that is included in the removed liquid component increases, so the nickel yield becomes bad, and not only does the cost of raw material simply increase, but the load of treating waist in a later process increases. Moreover, when the nickel composite hydroxide includes metal other than nickel, the deviation in the composition ratio of the nickel and other metal becomes large and has an effect on the battery characteristics.

In regards to this, the purpose of the primary crystallization process is to control the ratio of the average particle size per volume to 0.2 to 0.6, so it is also possible for the nickel amine complex concentration to be outside the range 10 mg/L to 1500 mg/L. This is because when the average particle size is controlled, the effect of the generation of minute particles is small as described above, and even though the non-crystallized nickel in the reaction aqueous solution increases, that nickel will crystallize in the secondary crystallization process.

(Reaction Temperature)

The temperature of the reaction aqueous solution in the primary crystallization process and secondary crystallization process is preferably kept at 40° C. to 70° C. As a result, it is possible to grow the particles of nickel composite hydroxide to be within the target range. When the temperature is less than 40° C., the solubility of the metal salt in the mixed aqueous solution is low and the salt concentration is low, so in the secondary crystallization process, there is a possibility that nucleation will increase, the number of minute particles will increase and the particle size distribution will become bad. Furthermore, the possibility that the ratio of the average particle size per volume will go outside of the range 0.2 to 0.6 also increases. When the temperature of the mixed aqueous solution is greater than 70° C., the volatilization of the ammonia increases and the nickel amine complex concentration is not stable.

(1-2) Nickel Composite Hydroxide for the Cathode Active Material of a Non-Aqueous Electrolyte Secondary Battery Next, the nickel composite hydroxide for the cathode active material of a non-aqueous electrolyte secondary battery of the present invention that is obtained by the production method above will be explained A feature of the nickel composite hydroxide is that the secondary particles, which are nearly spherical secondary particles that are formed by an aggregation of plural primary particles, have an average particle size per volume (MV) of 8.0 μm to 50.0 μm, and (D90−D10)/MV that indicates the relationship with the particle size distribution per volume is less than 0.5.

Here, a nearly spherical shape means that in addition to a spherical shape, the shape includes an elliptical shape of which the ratio of the minimum diameter and the maximum diameter (minimum diameter maximum diameter) of the external appearance is 0.6 or greater, or a lump-like shape. Moreover, D90 and D10 are the particle sizes when the cumulative distribution is 90% and 10%, respectively. D90 and D10, as in the case of the average particle size per volume (MV), can be measured by a laser diffraction scattering method that uses a laser diffraction particle size distribution meter.

(Average Particle Size)

The average particle size per volume (MV) of secondary particles must be 8.0 μm to 50.0 μm, and preferably 9.0 μm to 50.0 μm. By making the particle size of secondary particles large, it is possible to make the packing ability of the lithium nickel composite oxide that is obtained with nickel composite hydroxide as a precursor high. When the average particle size per volume (MV) is less than 8.0 µm, gaps between particles increase, and the packing ability of lithium nickel composite oxide that is obtained is reduced. On the other hand, when the average particle size per volume (MV) is greater than 50.0 µm, the lithium nickel composite oxide that is obtained easily clogs the filter when filtering the slurry of cathode material in the process for producing the cathode, and it becomes easy for lineation to occur during coating of the slurry.

In order to obtain even a higher packing ability, the average particle size per volume (MV) is more preferably 18.0 µm to 50.0 µm, and even more preferably 18.0 µm to 45.0 µm, and 20.0 µm to 40.0 µm is particularly preferable.

On the other hand, when trying to obtain a high output characteristic, the average particle size per volume (MV) of the secondary particles is more preferably 8.0 µm to 20.0 µm, and greater than 8.0 µm but no greater than 20 µm is even more preferable, and 8.5 µm to 15.0 µm is particularly preferable. In this case, the tap density of the secondary particles must be 1.9 g/cm$^3$ or greater, and preferably is 1.9 g/cm$^3$ to 2.5 g/cm$^3$. By controlling the average particle size per volume (MV) and the tap density so as to be within these ranges, mixing with minute particles is suppressed, so the coulomb efficiency and packing ability of the cathode active material that is obtained can both be achieved to a higher degree. The tap density can be found, for example, by a shaking specific gravity meter.

(Particle Size Distribution Per Volume)

By making (D90−D10)/MV, which indicates the relationship of the particle size distribution per volume, less than 0.5, and preferably no less than 0.3 but less than 0.5, and more preferably within the range 0.35 to 0.48, it is possible to reduce the minute particles that are included in the lithium nickel composite oxide that is obtained, and it is possible to suppress a decrease in battery characteristics such as thermal stability and cycling characteristic due to selective deterioration of minute particles. When (D90−D10)/MV becomes 0.5 or greater, not only is there a decrease in the battery characteristics, but there is also an increase in coarse particles, so it becomes easy for the filter to become clogged or for lineation to occur during coating of the slurry, and a suitable cathode active material for a non-aqueous electrolyte secondary battery cannot be obtained.

(Composition)

The nickel composite hydroxide of the present invention preferably has a composition that is expressed by the general expression: $Ni_{1-x-y}Co_xM_y(OH)_{2+A}$ (where $0 \le x \le 0.35$, $0 \le y \le 0.35$, $0 \le A \le 0.5$, and M is at least one additional element that is selected from the group comprising Mn, V, Mg, Al, Ti, Mo, Nb, Zr and W). With this composition, when the cathode active material for a non-aqueous electrolyte secondary battery that is obtained with this nickel composite hydroxide as a precursor is used as the cathode material, it is possible to obtain excellent battery characteristics.

In the nickel composite hydroxide of the present invention, the value of x that indicates the atomic ratio of cobalt (Co) is preferably 0.35 or less, and more preferably 0.22 or less. When the value of x is greater than 0.35, it is not possible to improve the cycling characteristic of the cathode active material.

The value of y that indicates the atomic ratio of the additional elements M is preferably 0.35 or less, and more preferably 0.15 or less. A small amount of the additional elements M is able to improve the durability and output characteristics of a battery. On the other hand, when the value of y is greater than 0.35, metal elements that contribute to the Redox reaction of the cathode active material are reduced, and the battery capacity decreases.

Moreover, when the total added amount of cobalt and additional elements M is too much, the battery capacity of a battery that is obtained using the lithium nickel composite oxide decreases. Therefore, the value x+y that indicates the total added amount (atomic ratio) of Co and additional element M is preferably less than 0.3 and more preferably 0.2 or less.

The added amount (atomic ratio) of Co and additional elements M coincides with the composition ratio of the raw material aqueous solution that is used in the primary crystallization process and secondary crystallization process of the nickel composite hydroxide. Therefore, in order to obtain a nickel composite hydroxide that has the composition ratio expressed by the general expression, a raw material aqueous solution that has been adjusted so as to have the composition ratio of the general expression should be supplied and coprecipitated. As such a method, a method of supplying the raw material aqueous solution using a mixed aqueous solution in which metal salts have been mixed in, or a method of individually supplying an aqueous solution for each metal element can be used.

(Additional Elements)

As the material of the additional elements M (at least one element selected from Mn, V, Mg, Al, Ti, Mo, Nb, Zr and W), it is possible to use, for example, titanium sulfate, ammonium peroxotitanic acid, potassium titanium oxalate, vanadium sulfate, ammonium vanadate, chromium sulfate, potassium chromate, zirconium sulfate, zirconium nitrate, niobium oxalic acid, ammonium molybdate, sodium tungstate, ammonium tungstate, and the like. The additional elements M are appropriately selected according to the use of the non-aqueous electrolyte secondary battery or according to the characteristics required for that non-aqueous electrolyte secondary battery.

These kinds of additional elements preferably cover the surface of the nickel composite hydroxide that was obtained by crystallization. For example, by making the composite hydroxide particles into a slurry in an aqueous solution that includes additional elements M, and by adding an aqueous solution that includes one or more of the additional elements while controlling the solution to a specified pH, and precipitating out the added elements onto the surface of the composite hydroxide particles by the crystallization reaction, it is possible to uniformly cover the surface of the particles with the added elements.

(2-1) Production Method for Cathode Active Material for a Non-Aqueous Electrolyte Secondary Battery In the following, a method for producing a cathode active material for a non-aqueous electrolyte secondary battery using the nickel composite hydroxide as a precursor will be explained. This production method includes: a mixing process in which the nickel composite hydroxide is mixed with a lithium compound so as to form a lithium mixture; and a calcination process in which calcination of this lithium mixture is performed in an oxidizing atmosphere at a temperature of 650° C. to 1100° C.

a) Mixing Process

The lithium compound is not particularly limited, and, for example, lithium hydroxide, lithium nitrate, lithium carbonate, or a combination of these can be easily obtained, so are preferred. Particularly, taking into consideration the ease of handling and stability of quality, the use of lithium hydroxide or lithium carbonate is preferred.

The nickel composite hydroxide and the lithium compound are mixed so that the number of atoms of metals other than lithium, or in other words, the total number of atoms of nickel, cobalt and additional metal (Me) and the number of atoms of lithium (Li) in the lithium mixture (Li/Me) is preferably 0.95 to 1.50, and more preferably 0.95 to 1.20, and so that when the value of x+y is less that 0.3, is preferably 0.95 to 1.20, and more preferably 0.98 to 1.10. In other words, before and after the calcination process, Li/Me does not change, so the nickel composite hydroxide and the lithium compound are mixed so that Li/Me in the lithium mixture is the same as Li/Me in the cathode active material to be obtained.

Moreover, to perform the mixing, it is possible to use a typical mixer, such as a shaker mixer, a Loedige mixer, a Julia mixer, a V blender or the like, and mixing should be performed so as to be sufficiently mixed without damaging the structure of the nickel composite hydroxide.

b) Roasting Process

Before the mixing process, there is preferably a roasting process that roasts the nickel composite hydroxide beforehand in an oxidizing atmosphere at a temperature of 300° C. to 1000° C.

By performing this kind of roasting process, the nickel composite hydroxide can be made into nickel composite oxide, and when that nickel composite oxide is mixed with the lithium compound, it is possible to stabilize the composition ratio of the lithium and metal elements in the lithium composite oxide while maintaining the packing ability of the lithium nickel composite oxide, so is preferred.

Preferably, the roasting temperature is 300° C. to 1000° C., and more preferably 400° C. to 800° C. When the roasting temperature is less than 300° C., there is a possibility that part of the hydroxide will remain, and that the composition ratio will not become stable. On the other hand, when the temperature is greater than 1000° C., sintering occurs between particles, which generates coarse particles, so the particle size distribution becomes bad.

c) Calcination Process

The calcination process is a process in which the lithium mixture that is obtained in the mixing process is calcined to form the lithium nickel composite oxide. The calcination process is performed in an oxidizing atmosphere at 650° C. to 1100° C., and is preferably performed at 650° C. to 950° C., and is more preferably performed at 700° C. to 900° C. When the calcination temperature is less than 650° C., the diffusion of lithium does not proceed sufficiently, and excess lithium will remain, so the crystal structure is not set, and it is not possible to obtain sufficient characteristics when used in a battery. On the other hand, when the calcination temperature is greater than 1100° C., there is a possibility that severe sintering will occur between particles of the composite oxide, and that abnormal particle growth will occur, so therefore, there is a possibility that the particles after calcination will become coarse and it will not be possible to maintain the nearly spherical shape. In the case of such cathode active material, the specific surface area decreases, so when used in a battery, a problem occurs in that the cathode resistance increases and the battery capacity decreases.

When the ratio of the total number of atoms of cobalt and additional elements M with respect to the number of atoms of all of the metal elements in the nickel composite hydroxide or nickel composite oxide (value of x+y in the general expression) is less than 0.3, calcination is preferably performed at a temperature of 650° C. to 800° C.

From the aspect of uniformly performing the reaction between the nickel composite hydroxide or nickel composite oxide and the lithium compound, it is preferred that the temperature rise at the rate of 1° C./min to 5° C./min. Furthermore, by maintaining the temperature at a temperature near the melting point of the lithium compound for 1 to 10 hours, it is possible to perform the reaction more uniformly.

(2-2) Cathode Active Material for a Non-Aqueous Electrolyte Secondary Battery

The cathode active material for a non-aqueous electrolyte secondary battery of the present invention comprises nearly spherical shaped secondary particles of lithium nickel composite oxide that are formed by an aggregation of plural primary particles, and a feature of those secondary particles is that the average particle size per volume (MV) is within the range 8.0 µm to 50.0 µm, and (D90−D10)/MV that indicates the relationship of the particle size distribution per volume is less than 0.5. This kind of cathode active material has a sharp particle size distribution, a high packing density, and can increase the capacity and improve the coulomb efficiency of non-aqueous electrolyte secondary battery that is obtained, so it can be suitably used as cathode material. Here, nearly spherical means that in addition to a spherical shape, the shape includes an elliptical shape of which the ratio of the minimum diameter and the maximum diameter (minimum diameter/maximum diameter) of the external appearance is 0.6 or greater, or a lump-like shape.

Moreover, the cathode active material for a non-aqueous electrolyte secondary battery of the present invention comprises a lithium nickel composite oxide having a layered hexagonal crystal structure, where part of the nickel (Ni) of the crystal lattice is replaced with cobalt (Co), so it is possible to cause expansion and contraction behavior of the crystal lattice due to insertion and release of lithium during charging and discharging, so it is possible to improve the cycling characteristic.

(Average Particle Size)

The average particle size per volume of the secondary particles of the cathode active material is 8.0 µm to 50.0 µm, and preferably is greater than 8.0 µm but no greater than 50.0 µm, and more preferably is 9.0 µm to 50.0 µm. When the average particle size per volume (MV) is within such a range, the cathode active material has a high packing ability, and it is also possible to avoid problems such as clogging of the filter in the production process.

In order to obtain an even higher packing ability, the average particle size per volume (MV) of the secondary particles is more preferably 18.0 µm to 50.0 µm, and even more preferably 18.0 µm to 45.0 µm, and 20.0 µm to 40.0 µm is particularly preferable.

On the other hand, when trying to obtain a high output characteristic, the average particle size per volume (MV) of the secondary particles is more preferably 8.0 µm to 20.0 µm, and is even more preferably greater than 8.0 µm but no greater than 20.0 am, and 8.5 am to 15.0 µm is particularly preferred. In this case, the tap density of the secondary particles must be 2.2 g/cm$^3$ or more. By performing control so that the average particle size per volume (MV) and the tap density are within such ranges, it is possible to keep the reactivity of the insertion and release of lithium high, so it is possible to improve the coulomb efficiency. The upper limit for the tap density is not particularly limited, however, under normal manufacturing conditions is about 2.7 g/cm$^3$.

The average particle size per volume (MV), D90 and D10 of the cathode active material, as in the case of the nickel composite hydroxide, can be measured by a laser diffraction scattering method using a laser diffraction particle size distribution meter. Moreover, the tap density also, as in the case of the nickel composite hydroxide, can be found by measurement using a shaking specific gravity meter.

(Particle Size Distribution Per Volume)

(D90−D10)/MV that indicates the relationship of the particle size distribution per volume is 0.5 or less, and is preferably 0.3 or more but less than 0.5, and more preferably is 0.35 to 0.48. With the particle size distribution per volume in such a range, it is possible to reduce the minute particles that are included in the cathode active material that is obtained, so it is possible to suppress a decrease in battery characteristics due to selective degradation of minute particles.

(Composition)

The composition of the cathode active material for a non-aqueous electrolyte secondary battery of the present invention is preferably expressed by the general expression: $Li_{1+u}Ni_{1-x-y}Co_xM_yO_2$ (where $-0.05 \le u \le 0.50$, $0 \le x \le 0.35$, $0 \le y \le 0.35$ and M is at least one additional element that is selected from the group comprising Mn, V, Mg, Al, Ti, Mo, Nb, Zr and W).

Here, u that indicates the excess amount of lithium is preferably −0.05 to 0.50, and more preferably −0.05 to 0.20. When the excess amount lithium u is less than −0.05, the reaction resistance of the cathode in a non-aqueous electrolyte secondary battery that uses the obtained cathode active material becomes large, so the output of the battery becomes low. On the other hand, when the excess amount of lithium is greater than 0.50, the initial electric discharge capacity of the secondary battery that used this cathode active material decreases, and the reaction resistance of the cathode increases. When the total added amount of Co and additional elements M, which is x+y, is less than 0.3, the excess amount of lithium u suppresses a decrease in the battery capacity, so preferably is 0.20 or less, and more preferably is within the range −0.02 to 0.10. The composition ratio of the metal elements other than lithium is maintained as was in the case of the nickel composite hydroxide. The composition of the cathode active material can be found by ICP atomic emission spectroscopy.

(Standard Deviation)

The standard deviation of the average particles size of primary particles that make up the secondary particles is preferably 10% or less, and more preferably 9.0% or less, and even more preferably 8.6% or less. By controlling the standard deviation so as to be within such a range, it is possible to make the insertion and release reaction of lithium between the secondary particles uniform, so it is possible to improve the coulomb efficiency.

Here, the average particle size of primary particles is the average particles size of primary particles that make up certain specified secondary particles, and the value is found by measuring the particle size of 10 or more primary particles that are included in the secondary particles, and taking the average measurement for that number of particles. The particle size of primary particles can be found by observing the cross section of a secondary particle with a scanning electron microscope and measuring the maximum diameter of the primary particles. Moreover, the standard deviation is a value that is obtained by finding the average particle sizes of primary particles for each of 10 or more secondary particles, and calculating the standard deviation of those.

(Coulomb Efficiency)

The cathode active material for a non-aqueous electrolyte secondary battery of the present invention has high lithium insertion/release reactivity and reacts uniformly, so, for example, when making a lithium coin cell battery 2032 (CR2032) that uses that cathode active material, the coulomb efficiency of that battery is preferably 90% or more, and more preferably 90.5% or more, and even more preferably is 91.0% or more. When the coulomb efficiency is less than 90%, it is not possible to obtain a high electric capacity.

Here, the coulomb efficiency is the percentage of electric discharge capacity with respect to the electric charge capacity [electric discharge capacity/electric charge capacity×100 (%)]. The coulomb efficiency can be found by constructing a non-aqueous electrolyte secondary battery as will be described later using the cathode active material of the present invention, and measuring the electric charge capacity and the electric discharge capacity.

(3) Non-Aqueous Electrolyte Secondary Battery

The non-aqueous electrolyte secondary battery of the present invention employs a cathode in which the cathode active material for a non-aqueous electrolyte secondary battery described above is used as the cathode. First, the construction of the non-aqueous electrolyte secondary battery of the present invention will be explained.

The non-aqueous electrolyte secondary battery of the present invention has construction that is essentially the sane as a typical non-aqueous electrolyte secondary battery except for using the cathode active material of the present invention as the cathode material.

More specifically, the secondary battery of the present invention has construction that comprises a case, and a cathode, an anode, a non-aqueous electrolyte, and a separator that are housed inside the case. That is, the secondary battery of the present invention is formed by making an electrode body in which a cathode and an anode are layered by way of a separator, impregnating the obtained electrode body with a non-aqueous electrolyte, connecting between the current collector of the cathode and the cathode terminal that passes through to the outside, and between the current collector of the anode and the anode terminal that passes through to the outside with respective collection leads, and then sealing the case.

Needless to say, the construction of the secondary battery of the present invention is not limited to the example described above, and it is possible to employ various shapes for the outward shape, such as a cylindrical shape, layered shape and the like.

(Cathode)

First, the cathode that is a feature of the secondary battery of the present invention will be explained. The cathode is a sheet-shaped member, and is formed by coating and drying a cathode mixture paste that includes the cathode active material of the present invention on the surface of the cathode collector that is made, for example, using aluminum foil.

The cathode is suitably processed according to the battery to be used. For example, processing such as a cutting process for forming the cathode to a suitable size to correspond to the target battery, a pressurizing compression process by a roll press or the like in order to increase the electrode density, and the like are performed.

The cathode mixture paste is formed by adding a solvent to a cathode mixture and then mixing and kneading. The cathode mixture is formed by mixing the powdered cathode active material of the present invention with conductive material and a binding agent.

The conductive material is added in order to give the electrode suitable electric conductivity. This conductive material is not particularly limited, and it is possible to use, for example, graphite (natural graphite, synthetic graphite, expanded graphite and the like), or a carbon black material such as acetylene black, Ketjen black and the like.

The binding agent serves the role of binding together the particles of the cathode active material. The binding agent that is used for this cathode mixture is not particularly limited, and for example, it is possible to use polyvinylidene fluoride (PVDF), polytetrafluoroethylene (PTFE), fluororubber, ethylene propylene diene rubber, styrene-butadiene, cellulose resin, polyacrylic acid and the like.

It is also possible to add activated carbon to the cathode mixture, and by adding activated carbon, it is possible to increase the electric double layer capacity of the cathode.

The solvent is used for dissolving the binding agent and dispersing the conductive material and activated carbon into the binding agent. This solvent is not particularly limited, and for example, it is possible to use an organic solvent such as N-methyl-2-pyrrolidone or the like.

Moreover, the mixture ratio of each of the substances in the cathode mixture paste is not particularly limited. For example, when the solid content of the cathode mixture except for the solvent is taken to be 100 parts by mass, then as in the cathode of a typical non-aqueous electrolyte secondary battery, the content of the cathode active material can be 60 to 95 parts by mass, the content of the conductive material can be 1 to 20 parts by mass, and the content of the binding agent can be 1 to 20 parts by mass.

(Anode)

The anode is a sheet-shape member that is formed by coating and drying an anode mixture paste on the surface of an anode collector made using a metal foil such as copper foil. This anode is essentially formed by the same method as the cathode, however the components and combination thereof of the anode mixture paste, and material of the collector are different; and the anode, as in the case of the cathode, undergoes various processing as necessary.

The anode mixture paste is formed into a paste by adding a suitable solvent to the anode mixture that is formed by mixing anode active material and binding agent.

For the anode active material, it is possible to use, for example, a lithium-containing material such as metallic lithium or a lithium alloy, or an occlusion material that is capable of occluding or releasing lithium ions.

The occlusion material is not particularly limited, and it is possible to use, for example, an organic compound fired body such as natural graphite, synthetic graphite, phenol resin or the like, and a powdered carbon material such as coke. In case that this kind of occlusion material is used in the anode active material, as in the case of the cathode, it is possible to use a fluororesin such as PVDF as a binding agent and to use an organic solvent such as N-methyl-2-pyrrolidone as a solvent for causing the anode active material to disperse into the binding agent.

(Separator)

The separator is arranged between the cathode and the anode, and has the function of separating the cathode and anode, and supporting the electrolyte. For this kind of separator, it is possible to use, for example, a thin film such as a thin polyethylene or polypropylene film that has many minutely small holes, however as long as the separator has the function described above, the separator is not particularly limited.

(Non-Aqueous Electrolyte)

The non-aqueous electrolyte is for dissolving the lithium salt that is used as a supporting salt in the organic solvent.

As the organic solvent, it is possible to use one type alone or a mixture of two types or more selected from a cyclic carbonate such as ethylene carbonate, propylene carbonate, butylene carbonate, trifluoro propylene carbonate and the like; moreover, a linear polycarbonate such as diethyl carbonate, dimethyl carbonate, ethyl methyl carbonate, dipropyl carbonate, and the like; furthermore, an ether compound such as tetrahydrofuran, 2-methyltetrahydrofuran, dimethoxyethane and the like; a sulfur compound such as ethyl methyl sulfone, butanesultone and the like; and a phosphorous compound such as triethyl phosphate, trioctyl phosphate and the like.

As a supporting salt, it is possible to use $LiPF_6$, $LiBF_4$, $LiClO_4$, $LiAsF_6$, $LiN(CF_3SO_2)_2$ and composite salts of these.

The non-aqueous electrolyte, in order to improve the battery characteristics, may also include a radical scavenger, a surfactant, a flame retardant, and the like.

(Characteristics of the Non-Aqueous Electrolyte Secondary Battery of the Present Invention)

The non-aqueous electrolyte secondary battery of the present invention has a cathode that is constructed as described above and that uses the cathode active material of the present invention, so a high packing density and high coulomb efficiency are obtained, and the battery has high capacity and excellent charge and discharge characteristics. When compared with conventional cathode active material using lithium nickel oxide, the heat stability is also high and safety is excellent.

(Applications for the Secondary Battery of the Present Invention)

The secondary battery of the present invention has the characteristics described above, so is suitable as the power source for compact mobile devices (notebook personal computers, mobile telephone terminals and the like) that require high capacity.

Moreover, the secondary battery of the present invention is also suitable as the power source for driving a motor that requires a high electric discharge characteristic. As batteries become larger, it becomes difficult to maintain safety, and expensive protective circuits are necessary and essential, however, the secondary battery of the present invention has excellent safety, so not only does maintaining safety become easier, but it is also possible to simplify and lower the cost of expensive protective circuitry Making the battery more compact and increasing the output is also possible, so the battery is also suitable as the power source for transport equipment having restricted installation space.

EXAMPLES

In the following, examples and comparative examples are used for explaining the present invention in further detail, however, the present invention is not limited by any of these examples.

In the examples and comparative examples below, measurement of the average particles size per volume and the particle size distribution is performed using a laser diffraction particle size distribution meter (Microtrac, manufactured by Nikkiso Co., Ltd.), and the tap density was measured using a shaking specific gravity meter (KRS-409, manufactured by Kuramochi Scientific Instruments Co., Ltd.). Moreover, the external appearance of particles was observed using a scanning electron microscope (S-4700, manufactured by Hitachi High-Technologies Corporation). Analysis of the composition was performed using an ICP emission analyzer (ICPS-8100, manufactured by Shixnadzu Corporation).

In these examples, unless stated otherwise, special grade chemicals manufactured by Wako Pure Chemical Industries, Ltd. were used in the production of the composite hydroxide and cathode active material, and construction of the secondary battery.

Example 1

900 ml of pure water and 40 ml of ammonia water (concentration: 25% by weight) were put into a 5 liter crystallization reaction vessel to which four baffle plates were attached, then after heating to 60° C. using a thermostatic oven and heating jacket, a caustic soda solution (concentration: 25% by weight) was added, and the pH inside the reaction vessel was adjusted to 11.0 at a reference liquid temperature of 25° C. to obtain a pre-reaction aqueous solution.

On the other hand, a combined solution of nickel sulfate (Ni molar concentration: 1.69 mol/L) and cobalt sulfate (Co molar concentration: 0.31 mol/L) was prepared as the raw material aqueous solution.

In the primary crystallization process, a nickel composite hydroxide slurry was obtained by using a constant volume pump to supply the raw material aqueous solution at a rate of 12.9 ml/min while stirring with the pre-reaction aqueous solution maintained at a temperature of 60° C., and by supplying ammonia water (concentration: 25% by weight) at a rate of 1.5 ml/min as the complexing agent, while at the same time continuously adding caustic soda solution (concentration: 25% by weight) as the neutralizing agent, and performing control so that the pH became 11.0 at a reference liquid temperature of 25° C.

Stirring was performed using an 85 mm diameter 6-blade inclined paddle (inclination angle: 45°) rotating at 800 rpm. After four hours had elapsed from the start of the reaction, at the instant when the reaction vessel became full, the average particle size per volume (MV) of the secondary particles of the composite hydroxide was 13.8 μm. The ratio of this average particle size per volume with respect to the target average particle size per volume (MV=25.0 μm) was 0.55.

Next, in the secondary crystallization process, concentration was performed by operating a cross-flow filtering apparatus (MEMBRALOX, manufactured by Nippon Pall Ltd. (Pall Corporation)) while maintaining the reaction pH at 11.0 at a reference liquid temperature of 25° C., then while keeping the amount of slurry in the tank constant, only the liquid component of the slurry was removed and crystallization was continued. The filter of the cross-flow filtering apparatus that was used had a pore diameter of 0.5 μm, and the material was α alumina.

Slurry was supplied by an air diaphragm pump (NDP-5FPT, manufactured by Yamada Corporation), and concentration was continuously performed while adjusting the filtration pressure. In the secondary crystallization process, the concentration of the nickel amarine complex was 790 mg/L.

After 32 hours had elapsed from the start of reaction (after 28 hours had elapsed after the start of the secondary crystallization process), all of the liquid pumps were stopped and the crystallization reaction was ended. After that, the composite hydroxide was separated into solid and liquid and washed, then dried to obtain a powdered composite hydroxide.

The average particle size per volume (MV) of the secondary particles of the obtained composite hydroxide was 25.4 μm, and (D90–D10)/MV was 0.47. These values are given in Table 1. Moreover, this nickel composite hydroxide was expressed by the general expression: $Ni_{0.84}Co_{0.16}(OH)_2$. The SEM image of the nickel composite hydroxide that was obtained in Example 1 is illustrated in FIG. 1.

Example 2

Except for extending the reaction time to 80 hours (76 hours from the start of the secondary crystallization process) and adjusting the nickel amine complex concentration to 810 mg/L, the secondary particles of composite hydroxide were obtained in the same was as in Example 1. The average particle size per volume (MV) of the secondary particles of the obtained composite hydroxide was 35.2 μm, and (D90–D10)/MV was 0.43. These values are given in Table 1. Moreover, this nickel composite hydroxide was expressed by the general expression: $Ni_{0.84}Co_{0.16}(OH)_2$.

Example 3

Except for controlling the pH in the secondary crystallization process to become 11.6 at a reference liquid temperature of 25° C., and adjusting the nickel amine complex concentration to 350 mg/L, the secondary particles of composite hydroxide were obtained in the same was as in Example 1. The average particle size per volume (MV) of the secondary particles before growth at the end of the primary crystallization process was 13.8 μm, the average particle size per volume (MV) of the secondary particles of nickel composite hydroxide after growth (after the end of the secondary crystallization process) was 24.8 μm, and (D90–D10)/MV was 0.48. These values are given in Table 1. Moreover, this nickel composite hydroxide was expressed by the general expression: $Ni_{0.84}Co_{0.16}(OH)_2$.

Example 4

Except for making the reaction temperature in the primary crystallization process and secondary crystallization process 40° C., and adjusting the nickel amine complex concentration to 1380 mg/L, the secondary particles of composite hydroxide were obtained in the same was as in Example 1. The average particle size per volume (MV) of the secondary particles before growth at the end of the primary crystallization process was 8.9 μm, the average particle size per volume (MV) of the secondary particles of nickel composite hydroxide after growth was 23.3 μm, and (D90–D10)/MV was 0.45. These values are given in Table 1. Moreover, this nickel composite hydroxide was expressed by the general expression: $Ni_{0.84}Co_{0.16}(OH)_2$.

Example 5

Except for controlling the pH in the primary crystallization process and secondary crystallization process to become 10.0 at a reference liquid temperature of 25° C., and adjusting the nickel amine complex concentration to 3220 mg/L, the secondary particles of composite hydroxide were obtained in the same was as in Example 1. The average particle size per volume (MV) of the secondary particles before growth at the end of the primary crystallization process was 9.1 μm, the average particle size per volume (MV) of the secondary particles of nickel composite hydroxide after growth was 22.1 μm, and (D90–D10)/MV was 0.47. These values are given in Table 1. Moreover, this nickel composite hydroxide was expressed by the general expression: $Ni_{0.84}Co_{0.16}(OH)_2$.

Example 6

Except for controlling the pH in the primary crystallization process and secondary crystallization process to become 12.8 at a reference liquid temperature of 25° C., and adjusting the nickel amine complex concentration to 12 mg/L, the secondary particles of composite hydroxide were obtained in the same was as in Example 1. The average particle size per volume (MV) of the secondary particles before growth at the end of the primary crystallization process was 3.5 µm, the average particle size per volume (MV) of the secondary particles of nickel composite hydroxide after growth was 10.0 µm, and (D90−D10)/MV was 0.49. These values are given in Table 1. Moreover, this nickel composite hydroxide was expressed by the general expression: $Ni_{0.84}Co_{0.16}(OH)_2$.

Comparative Example 1

Figure 2:
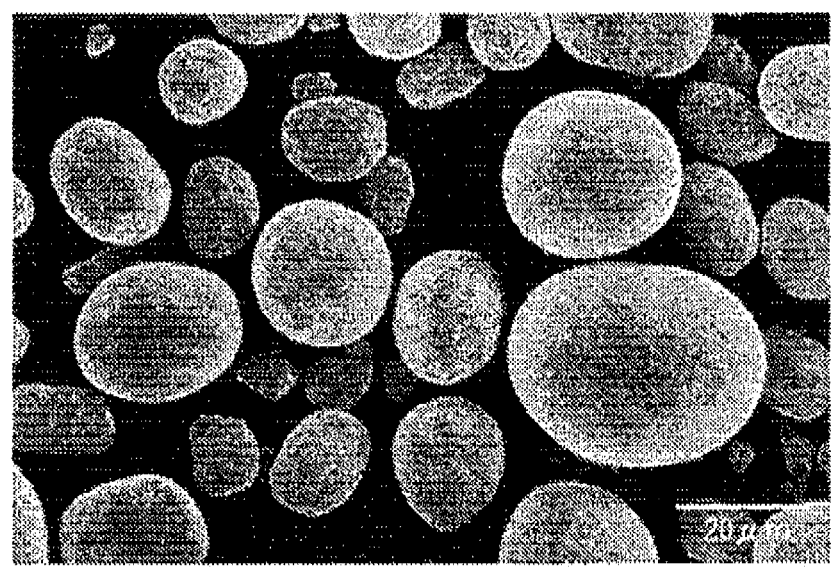
FIG. 2 is an SEM photograph (observation magnification rate: 1,000×) of a nickel composite hydroxide that was obtained in a first comparative example.

After crystallization was performed in the same way as in Example 1 up to where the reaction tank became full of solution, the overflowing composite hydroxide was continuously removed without performing concentration. The nickel amine concentration during this time was adjusted to 1020 mg/L. After 48 hours to 72 hours from the start of reaction, the average particle size per volume (MV) of the secondary particles of removed composite hydroxide was 32.0 µm, and (D90−D10)/MV was 0.98. These values are given in Table 1. Moreover, this nickel composite hydroxide was expressed by the general expression: $Ni_{0.84}Co_{0.16}(OH)_2$. The SEM image of the nickel composite hydroxide that was obtained in Comparative Example 1 is illustrated in FIG. 2. It could be confirmed that the particle size of the obtained composite hydroxide was not uniform, and the particle size distribution was large.

Comparative Example 2

Except for controlling the pH in the primary crystallization process and secondary crystallization process to become 13.5 at a reference liquid temperature of 25° C., and adjusting the nickel amine complex concentration to 2 mg/L, the secondary particles of composite hydroxide were obtained in the same was as in Example 1. The average particle size per volume (MV) of the secondary particles before growth at the end of the primary crystallization process was 2.7 µm, the average particle size per volume (MV) of the secondary particles of nickel composite hydroxide after growth was 3.4 µm, and (D90−D10)/MV was 0.58. These values are given in Table 1. Moreover, this nickel composite hydroxide was expressed by the general expression: $Ni_{0.84}Co_{0.16}(OH)_2$.

Example 7

The nickel composite hydroxide that was produced in Example 1 to Example 6, and Comparative Example 1 and Comparative Example 2 was moved to a different reaction tank and mixing with water at normal temperature to obtain a slurry, and then a sodium aluminate aqueous solution and sulfuric acid were added to this mixed aqueous solution while stirring, and the pH value of the slurry was adjusted to 9.5. After that, coating the surface of the secondary particles of nickel composite hydroxide with aluminum hydroxide was performed by continuing to stir for one hour. When doing this, the sodium aluminate aqueous solution was added so that the molar ratio of the metal elements in the slurry became nickel:cobalt:aluminum=0.84:0.12:0.04. After stirring was stopped, the sodium aluminate aqueous solution was filtered and washed to obtain a nickel composite hydroxide that was covered with aluminum (nickel cobalt aluminum composite hydroxide).

The obtained nickel composite hydroxide was roasted at 700° C. for 6 hours in an air atmosphere. The average particle size per volume (MV), (D90−D10)/MV and composition of the secondary particles of the obtained composite oxide are given in Table 2. From this, it can be seen that when composite hydroxide that was produced using the production method of the present invention was used as a precursor, a composite oxide was obtained in which the average particle size per volume (MV) was 18.0 µm to 50.0 µm, and the particle size distribution (D90−D10)/MV was less than 0.5.

Example 8

Lithium hydroxide was weighed so that Li/Me=1.02 (u=0.02), and then mixed with the nickel composite hydroxide that was obtained in Example 1 and the nickel composite oxide that was obtained from Example 7 (nickel composite oxide that used the nickel cobalt aluminum composite hydroxide of Example 1 to Example 6, Comparative Example 1 and Comparative Example 2), to form a lithium mixture. Mixing was performed using a shaker mixer (TURBULA Type T2C, manufactured by Wille et Backofen Corporation (WAB)).

The obtained mixture was roasted for 8 hours at 750° C. in an oxygen atmosphere (Oxygen: 100% by volume), and then after cooling was crushed to obtain cathode active material. Through X-ray diffraction, the obtained cathode active materials were all confirmed to be a hexagonal single crystal lithium nickel composite oxide.

Moreover, for this cathode active material, the average particle size per volume (MV), (D90−D10)/MV and composition of the secondary particles were measured according to the specified methods described above. The results are given in Table 3. From this, it can be seen that when composite hydroxide or composite oxide that was produced using the production method of the present invention was used as raw material, a lithium nickel composite oxide is obtained that has a good particle size distribution of which (D90−D10)/MV is small.

TABLE 1

(Nickel Composite Hydroxide)

| | Reaction Time (hr) | Reaction pH | Reaction Temperature (° C.) | Complex Concentration (mg/L) |
|---|---|---|---|---|
| Example 1 | 32 | 11.0 → 11.0 | 60 | 790 |
| Example 2 | 80 | 11.0 → 11.0 | 60 | 810 |
| Example 3 | 32 | 11.0 → 11.6 | 60 | 350 |
| Example 4 | 32 | 11.0 → 11.0 | 40 | 1380 |
| Example 5 | 32 | 10.0 → 10.0 | 60 | 3220 |
| Example 6 | 32 | 12.8 → 12.8 | 60 | 12 |
| Comparative Example 1 | 48 to 72 | 11.0 → 11.0 | 60 | 1020 |
| Comparative Example 2 | 32 | 13.5 → 13.5 | 60 | 2 |

| | Ratio of Average Particle Size Per Volume | (D90 − D10)/MV (µm) | Tap Density (g/cm³) |
|---|---|---|---|
| Example 1 | 0.55 | 25.4 | 0.47 |
| Example 2 | 0.39 | 35.2 | 0.43 |
| Example 3 | 0.55 | 24.8 | 0.48 |
| Example 4 | 0.38 | 23.3 | 0.45 |
| Example 5 | 0.41 | 22.1 | 0.47 |
| Example 6 | 0.35 | 10.0 | 0.49 |

TABLE 1-continued (Nickel Composite Hydroxide)

| | | | |
|---|---|---|---|
| Comparative Example 1 | — | 32.0 | 0.98 |
| Comparative Example 2 | 0.79 | 8.4 | 0.58 |

TABLE 2

(Nickel Composite Oxide)

| | Average Particle Size Per Volume (μm) | (D90 − D10)/ MV | Composition Ratio |
|---|---|---|---|
| Example 1 | 24.9 | 0.48 | $Ni_{0.84}Co_{0.12}Al_{0.04}O_2$ |
| Example 2 | 34.9 | 0.43 | $Ni_{0.84}Co_{0.12}Al_{0.04}O_2$ |
| Example 3 | 24.3 | 0.48 | $Ni_{0.84}Co_{0.12}Al_{0.04}O_2$ |
| Example 4 | 22.8 | 0.47 | $Ni_{0.84}Co_{0.12}Al_{0.04}O_2$ |
| Example 5 | 21.9 | 0.48 | $Ni_{0.84}Co_{0.12}Al_{0.04}O_2$ |
| Example 6 | 9.7 | 0.49 | $Ni_{0.84}Co_{0.12}Al_{0.04}O_2$ |
| Comparative Example 1 | 30.3 | 1.01 | $Ni_{0.84}Co_{0.12}Al_{0.04}O_2$ |
| Comparative Example 2 | 3.6 | 0.63 | $Ni_{0.84}Co_{0.12}Al_{0.04}O_2$ |

TABLE 3

(Cathode Active Material)

| | Roasting Temperature (° C.) | Average Particle Size Per Volume (μm) | (D90 − D10)/ MV | Composition Ratio |
|---|---|---|---|---|
| Example 1 | No Roasting | 23.4 | 0.47 | $Li_{1.02}Ni_{0.84}Co_{0.16}O_2$ |
| | 700 | 23.6 | 0.45 | $Li_{1.02}Ni_{0.84}Co_{0.12}Al_{0.04}O_2$ |
| Example 2 | 700 | 31.9 | 0.46 | $Li_{1.02}Ni_{0.84}Co_{0.12}Al_{0.04}O_2$ |
| Example 3 | 700 | 24.1 | 0.48 | $Li_{1.02}Ni_{0.84}Co_{0.12}Al_{0.04}O_2$ |
| Example 4 | 700 | 22.2 | 0.46 | $Li_{1.02}Ni_{0.84}Co_{0.12}Al_{0.04}O_2$ |
| Example 5 | 700 | 21.2 | 0.48 | $Li_{1.02}Ni_{0.84}Co_{0.12}Al_{0.04}O_2$ |
| Example 6 | 700 | 9.9 | 0.49 | $Li_{1.02}Ni_{0.84}Co_{0.12}Al_{0.04}O_2$ |
| Comparative Example 1 | 700 | 26.7 | 1.01 | $Li_{1.02}Ni_{0.84}Co_{0.12}Al_{0.04}O_2$ |
| Comparative Example 2 | 700 | 8.6 | 1.89 | $Li_{1.02}Ni_{0.84}Co_{0.12}Al_{0.04}O_2$ |

Example 9

900 ml of pure water and 40 ml of ammonia water (concentration: 25% by weight) were put into a 5 liter crystallization reaction vessel to which four baffle plates were attached, then after heating to 60° C. using a thermostatic oven and heating jacket, a caustic soda solution (concentration: 25% by weight) was added, and the pH inside the reaction vessel was adjusted to 11.0 at a reference liquid temperature of 25° C. to obtain a pre-reaction aqueous solution.

On the other hand, a combined solution of nickel sulfate (Ni molar concentration: 0.956 mol/L), cobalt sulfate (Co molar concentration: 0.370 mol/L) and manganese sulfate (Mn molar concentration: 0.586 mol/L) was prepared as the raw material aqueous solution.

In the primary crystallization process, a nickel composite hydroxide slurry was obtained by using a constant volume pump to supply the raw material aqueous solution at a rate of 12.9 ml/min while stirring with the pre-reaction aqueous solution maintained at a temperature of 60° C., and by supplying ammonia water (concentration: 25% by weight) at a rate of 3.0 ml/min as the complexing agent, while at the same time continuously adding caustic soda solution (concentration: 25% by weight) as the neutralizing agent, and performing control so that the pH became 11.0 at a reference liquid temperature of 25° C.

Stirring was performed using an 85 mm diameter 6-blade inclined paddle (inclination angle: 45°) rotating at 1000 rpm. After four hours had elapsed from the start of the reaction, at the instant when the reaction vessel became full, the average particle size per volume (MV) of the secondary particles of the composite hydroxide was 4.8 μm. The ratio of this average particle size per volume with respect to the target average particle size per volume (MV=9.0 μm) was 0.53.

Next, in the secondary crystallization process, concentration was performed by operating a cross-flow filtering apparatus (MEMBRALOX, manufactured by Nippon Pall Ltd. (Pall Corporation)) while maintaining the reaction pH at 11.0 at a reference liquid temperature of 25° C., then while keeping the amount of slurry in the tank constant, only the liquid component of the slurry was removed and crystallization was continued. The filter of the cross-flow filtering apparatus that was used had a pore diameter of 0.5 μm, and the material was α alumina.

Slurry was supplied by an air diaphragm pump (NDP-5FPT, manufactured by Yamada Corporation), and concentration was continuously performed while adjusting the filtration pressure. In the secondary crystallization process, the concentration of the nickel amine complex was 790 mg/L.

After 8 hours had elapsed from the start of reaction (after 4 hours had elapsed after the start of the secondary crystallization process), all of the liquid pumps were stopped and the crystallization reaction was ended. After that, the composite hydroxide was separated into solid and liquid and washed, then dried to obtain a powdered composite hydroxide.

Figure 3:
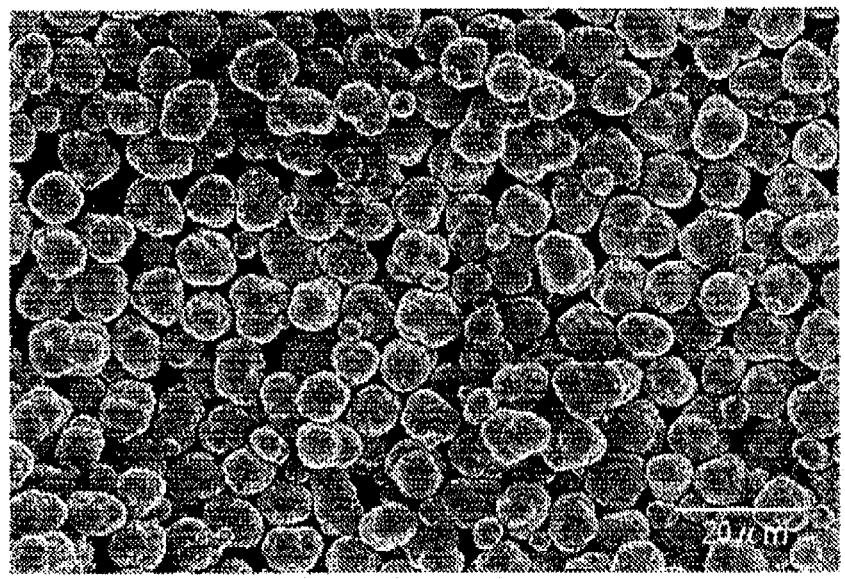
FIG. 3 is an SEM photograph (observation magnification rate: 1,000×) of a nickel composite hydroxide that was obtained in a ninth example.

The average particle size per volume (MV) of the secondary particles of the obtained composite hydroxide was 9.2 μm, (D90−D10)/MV was 0.47 and the tap density was 2.04 g/cm³. These values are given in Table 4. Moreover, this nickel composite hydroxide was expressed by the general expression: $Ni_{0.50}Co_{0.20}Mn_{0.30}(OH)_2$. The SEM image of the nickel composite hydroxide that was obtained in Example 9 is illustrated in FIG. 3.

Example 10

Except for extending the reaction time to 20 hours (16 hours from the start of the secondary crystallization process) and adjusting the nickel amine complex concentration to 810 mg/L, the secondary particles of composite hydroxide were obtained in the same was as in Example 9. The average particle size per volume (MV) of the secondary particles before growth at the end of the primary crystallization process of this composite hydroxide was 5.1 μm, the average particle size per volume (MV) of the secondary particles of nickel composite hydroxide after growth (after the end of the secondary crystallization process) was 13.3 μm, and (D90−D10)/MV was 0.42. These values are given in Table 4. Moreover, this nickel composite hydroxide was expressed by the general expression: $Ni_{0.50}Co_{0.20}Mn_{0.30}(OH)_2$.

Example 11

Except for adjusting the nickel amine complex concentration to 1380 mg/L, the secondary particles of composite hydroxide were obtained in the same was as in Example 9. The average particle size per volume (MV) of the secondary particles before growth at the end of the primary crystallization process of this composite hydroxide was 3.4 μm, the average particle size per volume (MV) of the secondary particles of nickel composite hydroxide after growth was 9.3 μm, and (D90–D10)/MV was 0.45. These values are given in Table 4. Moreover, this nickel composite hydroxide was expressed by the general expression: $Ni_{0.50}Co_{0.20}Mn_{0.30}(OH)_2$.

Comparative Example 3

Figure 4:
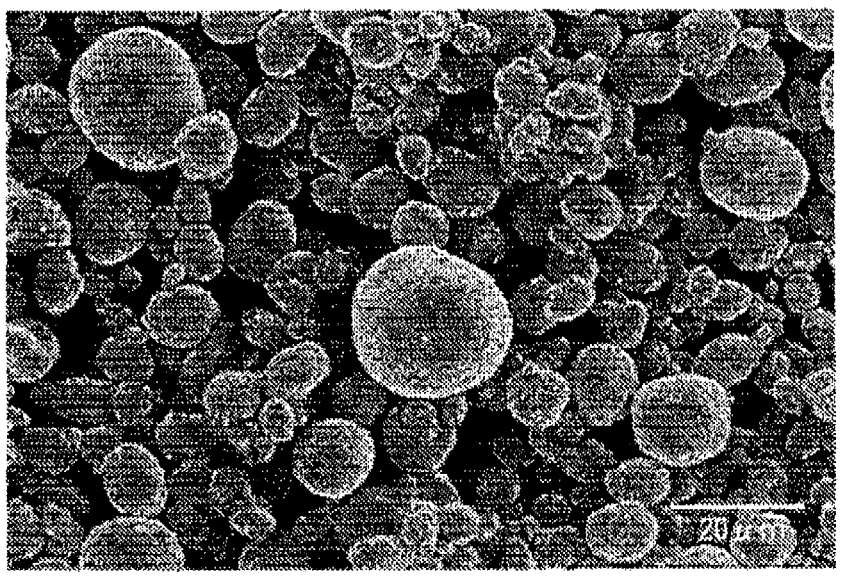
FIG. 4 is an SEM photograph (observation magnification rate: 1,000×) of a nickel composite hydroxide that was obtained in a third comparative example.

After crystallization was performed in the same way as in Example 9 up to where the reaction tank became full of solution, the overflowing composite hydroxide was continuously removed without performing concentration. The nickel amine concentration during this time was adjusted to 1020 mg/L. After 14 hours to 18 hours from the start of reaction, the average particle size per volume (MV) of the secondary particles of removed composite hydroxide was 10.8 μm, and (D90–D10)/MV was 0.98. These values are given in Table 4. Moreover, this nickel composite hydroxide was expressed by the general expression: $Ni_{0.50}Co_{0.20}Mn_{0.30}(OH)_2$. The SEM image of the nickel composite hydroxide that was obtained in Comparative Example 3 is illustrated in FIG. 4. It could be confirmed that the particle size of the obtained composite hydroxide was not uniform, and that the particle size distribution was large.

Comparative Example 4

Except for controlling the pH to become 13.5 at a reference liquid temperature of 25° C., the secondary particles of composite hydroxide were obtained in the same was as in Example 9. The average particle size per volume (MV) of the secondary particles before growth at the end of the primary crystallization process of this composite hydroxide was 2.7 μm, the average particle size per volume (MV) of the secondary particles of nickel composite hydroxide after growth was 3.4 μm, and (D90–D10)/MV was 0.61. These values are given in Table 4. Moreover, this nickel composite hydroxide was expressed by the general expression: $Ni_{0.50}Co_{0.20}Mn_{0.30}(OH)_2$.

Example 12

Lithium hydroxide was weighed so that Li/Me=1.02 (u=0.02), and then mixed with the nickel composite hydroxide that was obtained in Examples 9 to 11 to form a lithium mixture. Mixing was performed using a shaker mixer as in Example 8.

The obtained lithium mixture was roasted for 8 hours at 900° C. in an air atmosphere, and then after cooling was crushed to obtain cathode active material. Through X-ray diffraction, the obtained cathode active materials were all confirmed to be a hexagonal single crystal lithium nickel composite oxide expressed by the general expression: $Li_{1.02}Ni_{0.50}Co_{0.20}Mn_{0.30}O_2$.

For this cathode active material, the average particle size per volume (MV), (D90–D10)/MV and composition of the secondary particles were measured according to the specified methods described above, and evaluation was performed for the items below.

[Standard Deviation of Average Particle Size of Primary Particles]

Secondary particles having different particle size from external appearance were selected from among the obtained cathode active material, then the particle size of 10 or more primary particles that were included in each of the secondary particles was observed using a scanning electron microscope (S-4700, manufactured by Hitachi High-Technologies Corporation) to observe the cross section of the secondary particles and the maximum diameters of the primary particles were measured and the average value of these diameters (average particle size of primary particles) was found and the standard deviation was calculated.

[Battery Evaluation]

A lithium coin cell battery 2032 (CR2032) was constructed using the obtained cathode active material, and with that battery the initial capacity was evaluated. More specifically, 20% by weight of acetylene black and 10% by weight of PTFE were added to and mixed with 70% by weight of the cathode active material powder, after which 150 mg was weighed and a pellet was made as a cathode. Moreover, using lithium metal for the anode, and using a mixture solution of equal parts of ethylene carbonate (EC) and diethyl carbonate (DE) with 1 M of LiClO as a supporting salt (manufactured by Tomiyama Pure Chemical Industries, Ltd) for an electrolyte, a lithium coin cell battery 2032 (CR2032) was made in a glovebox having an Ar atmosphere that was controlled at freezing point of –80° C.

The battery that was made was left for approximately 24 hours, and after the Open Circuit Voltage (OCV) became stable, the battery was charged to a cutoff voltage of 4.3 V with the current density with respect to the cathode being 0.5 mA/cm³, and this was taken to be the initial charge capacity, then after a one hour rest, the capacity after the battery was discharged to a cutoff voltage of 3.0 V was taken to be the initial discharge capacity. From these values, the coulomb efficiency [electric discharge capacity electric charge capacity×100(%)] was found.

These results are given in Table 5.

TABLE 4

(Nickel Composite Hydroxide)

| | Reaction Time (hr) | Reaction pH | Reaction Temperature (° C.) | Complex Concentration (mg/L) |
|---|---|---|---|---|
| Example 9 | 8 | 11.0 → 11.0 | 60 | 790 |
| Example 10 | 20 | 11.0 → 11.0 | 60 | 810 |
| Example 11 | 8 | 11.0 → 11.0 | 60 | 1380 |
| Comparative Example 4 | 14 to 18 | 11.0 → 11.0 | 60 | 1020 |
| Comparative Example 5 | 8 | 13.5 → 13.5 | 60 | 790 |

| | Ratio of Average Particle Size Per Volume | Average Particle Size Per Volume (μm) | (D90 – D10)/ MV | Tap Density (g/cm3) |
|---|---|---|---|---|
| Example 9 | 0.53 | 9.2 | 0.47 | 2.04 |
| Example 10 | 0.38 | 13.3 | 0.42 | 2.14 |
| Example 11 | 0.37 | 9.3 | 0.45 | 2.11 |
| Comparative Example 3 | 0.42 | 10.8 | 0.98 | 2.28 |
| Comparative Example 4 | 0.77 | 3.4 | 0.61 | 1.51 |

TABLE 5

| (Cathode Active Material | | | |
|---|---|---|---|
| | Average Particle Size Per Volume (μm) | (D90 − D10)/MV | Tap Density (g/cm3) |
| Example 9 | 8.7 | 0.43 | 2.34 |
| Example 10 | 12.6 | 0.40 | 2.50 |
| Example 11 | 9.0 | 0.41 | 2.39 |
| Comparative Example 3 | 10.3 | 0.94 | 2.10 |
| Comparative Example 4 | 3.1 | 0.56 | 1.57 |

| | Composition ratio | Standard Deviation (%) | Coulomb Efficiency (%) |
|---|---|---|---|
| Example 9 | $Li_{1.02}Ni_{0.50}Co_{0.20}Mn_{0.30}O_2$ | 8.1 | 90.5 |
| Example 10 | $Li_{1.02}Ni_{0.50}Co_{0.20}Mn_{0.30}O_2$ | 8.6 | 91.0 |
| Example 11 | $Li_{1.02}Ni_{0.50}Co_{0.20}Mn_{0.30}O_2$ | 7.8 | 90.8 |
| Comparative Example 3 | $Li_{1.02}Ni_{0.50}Co_{0.20}Mn_{0.30}O_2$ | 14.4 | 87.7 |
| Comparative Example 4 | $Li_{1.02}Ni_{0.50}Co_{0.20}Mn_{0.30}O_2$ | 10.5 | 88.4 |

What is claimed is:

1. A production method for producing a nickel composite hydroxide as a precursor to a cathode active material for a non-aqueous electrolyte secondary battery;

the method producing the nickel composite hydroxide by supplying an aqueous solution including at least a nickel salt; a neutralizing agent; and an ammonium ion donor; to a reaction vessel while stirring, and performing a crystallization reaction, comprising:

a primary crystallization process of obtaining a nickel composite hydroxide slurry while performing control so that a ratio of an average particle size per volume (MV) of secondary particles of nickel hydroxide that are generated inside the reaction vessel with respect to an average particle size per volume (MV) of secondary particles of nickel composite hydroxide that will finally be obtained becomes 0.2 to 0.6; and a second crystallization process of continuing the crystallization reaction until the average particles size per volume (MV) of secondary particles of the nickel composite hydroxide becomes 9.0 μm to 50.0 μm, while at the same time maintaining an amount of the slurry obtained in the primary crystallization process and continually removing only a liquid component of the slurry.

2. The production method for producing nickel composite hydroxide according to claim 1, wherein in the primary crystallization process, a pH of the slurry is controlled to be within a range of 10 to 13 at a reference liquid temperature of 25° C.

3. The production method for producing nickel composite hydroxide according to claim 1, wherein, in the secondary crystallization process, a concentration of a nickel amine complex in the slurry is controlled to be within a range of 10 mg/L to 1500 mg/L.

4. The production method for producing nickel composite hydroxide according to claim 1, wherein, in the secondary crystallization process, the amount of the slurry is kept constant by using a cross-flow filtering apparatus.

* * * * *